May 4, 1954     J. B. PARSONS     2,677,524
SOLENOID CONTROLLED VALVE ASSEMBLY
Filed Nov. 9, 1950
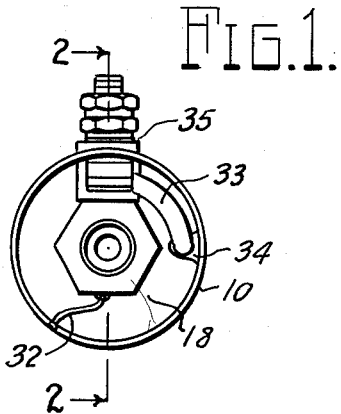
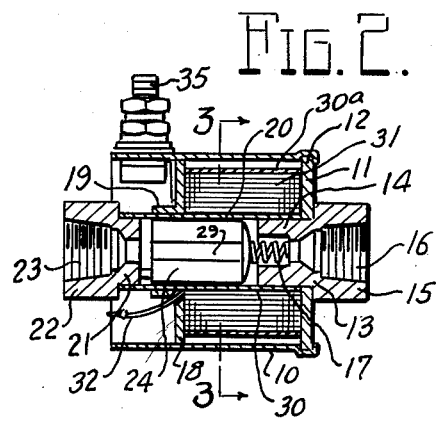
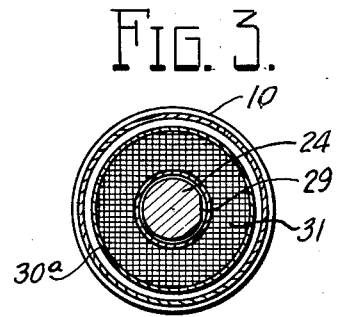
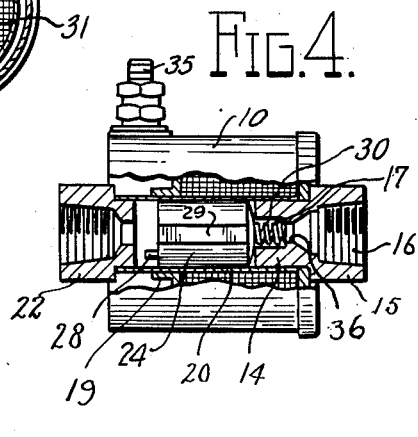
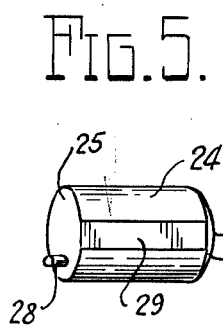
INVENTOR.
John B. Parsons
BY
Malcolm W. Fraser
ATTORNEY Patented May 4, 1954

2,677,524

UNITED STATES PATENT OFFICE 2,677,524

SOLENOID CONTROLLED VALVE ASSEMBLY

John B. Parsons, Maumee, Ohio

Application November 9, 1950, Serial No. 194,801

1 Claim. (Cl. 251—139)

This invention relates to solenoid controlled valve assemblies, but particularly to an assembly of this character which is adapted electromagnetically to control the fluid flow axially therethrough, and an object is to produce a simple and efficient assembly of this character which is sturdy and reliable in construction, easy to assemble, inexpensive to manufacture, and has the new and improved features of construction and operation hereinafter set forth.

For purposes of illustration but not of limitation, an embodiment of the invention is shown in the accompanying drawings, in which Figure 1 is an end elevation of the solenoid controlled valve assembly;

Figure 2 is a longitudinal view substantially on the line 2—2 of Figure 1;

Figure 3 is a transverse sectional view substantially on the line 3—3 of Figure 2;

Figure 4 is a view somewhat similar to Figure 2, but showing the valve in closed position having been moved to such position in response to energization of the solenod; and Figure 5 is a perspective view of the valve member.

The illustrated embodiment of the invention comprises a solenoid controlled valve assembly comprising an annular sheet metal housing 10, open at opposite ends. A flat washer-like disc 11 closes one end of the housing 10, the metal of the housing being crimped over the disc as indicated at 12, thereby holding it in place. The disc has a central aperture 13 through which projects the reduced extension 14 of a valve-receiving fitting 15 which has a tapered screw-threaded opening 16 to enable the tube or hose to be suitably fastened thereto. Thus the fitting 15 is in the form of a shouldered member, the shouldered portion engaging the outer face of the disc 11 and the reduced tubular extension 14 projecting a substantial distance inside of the housing. The fitting is hollow axially, a socket 17 being formed in the extension 14 for a purpose which will hereinafter be described.

Disposed within the housing 10 and spaced from the disc 11 is a flat washer-like disc 18 which is formed with a central outwardly extending flange 19. Fitting snugly over the extension 14 and abutting against the inner face of the disc 11 is a relatively thin metallic sleeve 20 which is snugly engaged by the flange 19. The opposite end of the sleeve terminates slightly short of the adjacent end of the housing 10. A reduced extension 21 fits snugly inside of this end of the sleeve 20. The reduced extension 21 forms a part of a fitting 22 which likewise has a tapered threaded opening 23 to suitably receive a hose or tube as will be readily understood. This fitting is similarly hollow and is axially aligned with the fitting 15.

Slidably fitting the sleeve 20 is a cylindrical valve member 24 formed of a single imperforate length of metal rod or the like, one face 25 of which is flat and the opposite face 26 of which is convex with a flattened central portion 27. Suitably fixed to the flattened end 25 of the valve member and arranged eccentrically thereof is a pin 28 which is adapted to abut against the inner end of the fitting extension 21 thereby to limit the movement of the valve member in the direction toward the fitting 22. This represents the normal open position of the valve and liquid may pass from one fitting to the other around the outside of the valve 24, the channel being formed between the valve and the sleeve 22 by a flattened portion 29 which extends longitudinally of the valve.

The valve member 24 is yieldingly held in its normal or open position by a helical coil spring 30 which is disposed within the socket 17 of the fitting extension 14. One end of the spring 30 bears against the flattened portion 27 of the valve member. The convex portion 26 of the valve member 24 provides a seating surface adapted to abut against the inner or free end of the fitting extension 14 thereby to prevent the flow of fluid through the valve assembly as will readily be apparent.

Surrounding the sleeve 20 is a solenoid winding 31, one end 32 of which projects through an opening in the central portion of the disc 18 and has a ground connection with the adjacent end portion of the housing 10. A suitable cover 30a encloses the windings 31 and is spaced from the housing wall 10 and abuts at opposite ends against the discs 11 and 18. The opposite terminal 33 from the windings 31 extends through a notch 34 in the periphery of the disc 18 and is secured as by soldering to a binding post 35 which projects laterally of the housing 10.

From the above description, it will be manifest that I have produced a solenoid controlled valve assembly which can be readily and inexpensively produced on a quantity production basis due to the simplicity of assembly and the design of the parts. Although the assembly lends itself for the handling of various fluids, it is particularly useful and satisfactory in the handling of liquids, enabling the flow to be readily controlled. So long as the solenoid is energized, the valve remains seated, thereby shutting off the flow of liquid in either direction but as soon as the solenoid is deenergized, the spring 30 shifts the valve to its normal open position enabling the flow of liquid about the exterior of the valve member.

Preferably the parts such as the fittings 15 and 22, sleeve 20 and discs 11 and 18 are hydrogen brazed to produce a sealed rigid unit. The brazing is performed with the slide valve 24 within the sleeve 20 but without the coil spring 30 since the brazing would tend to affect the temper of the spring. The spring is assembled afterwards by forcing it through the constricted opening 36, which is of less diameter than the socket 17 so that when the spring enters the socket, it seats on the ledge surrounding the opening 36, the other end seating against the flat end 27 of the valve.

It is to be understood that numerous changes in details of construction, arrangement and operation may be effected without departing from the spirit of the invention especially as defined in the appended claim.

What I claim is:

A solenoid controlled valve assembly comprising an open ended casing of uniform diameter throughout, a flat washer-like centrally apertured disc closing one end of said casing and intimately fitting the inner wall thereof, a hollow valve-receiving fitting having a reduced extension projecting through and rigidly connected to the walls of the disc aperture, a socket in the inner end of said fitting extension, a second flat washer-like centrally apertured disc snugly fitting within said casing and spaced from said first disc, an outwardly extending annular flange on said disc defining the central aperture thereof, a thin metallic sleeve snugly fitting said annular flange and enclosing said fitting extension, one end of said sleeve abutting said first disc, a second hollow fitting having an extension projecting snugly into the other end of said sleeve, a rod-like cylindrical valve slidable in said sleeve and having a flat face at one end, a flattened surface on the exterior of the valve extending longitudinally thereof from end to end, a convex face at the other end of said valve providing a seating surface to abut against the inner end of said first fitting extension, a flat central portion on said convex face, a coil spring bearing at one end against said flat portion and having its opposite end portion disposed in said socket in said first fitting extension, an outwardly extending pin on said flat face of the valve and arranged to abut against the inner end of the adjacent fitting extension, and a solenoid winding about said sleeve and occupying the space between said washer-like discs.

References Cited in the file of this patent

UNITED STATES PATENTS

| Number | Name | Date |
|---|---|---|
| 1,622,672 | Raymond | Mar. 29, 1927 |
| 1,674,914 | Murray | June 26, 1928 |
| 2,279,243 | Parsons | Apr. 7, 1942 |
| 2,289,310 | Steel | July 7, 1942 |
| 2,353,161 | Heigis | July 11, 1944 |
| 2,414,409 | Goepfrich | Jan. 14, 1947 |
| 2,472,544 | Nissen | June 7, 1949 |
| 2,502,118 | Ashton | Mar. 28, 1950 |
| 2,546,325 | Wasserlein | Mar. 27, 1951 |
| 2,607,368 | Mayer | Aug. 19, 1952 |

FOREIGN PATENTS

| Number | Country | Date |
|---|---|---|
| 208,703 | Great Britain | July 10, 1924 |
| 580,816 | Great Britain | Sept. 20, 1946 |
| 688,114 | France | May 6, 1930 |